Sept. 26, 1967   F. C. CHIANG   3,343,416
LIQUID LEVEL TELEMETERING
Filed June 17, 1965

INVENTOR.
FRANKLIN C. CHIANG
BY
Lippincott, Ralls & Hendrickson
ATTORNEYS 3,343,416
LIQUID LEVEL TELEMETERING
Franklin C. Chiang, Palo Alto, Calif., assignor to Hewlett-Packard Company, a corporation of California
Filed June 17, 1965, Ser. No. 464,791
5 Claims. (Cl. 73—313)

ABSTRACT OF THE DISCLOSURE

A liquid level telemetering system which utilizes a variable electrical delay means. A float operates to vary the time that an electrical pulse is delayed in the delay means in response to variations in liquid level.

---

This invention relates generally to liquid level measurements, and is more particularly directed to a liquid level telemeter by which the level of liquid in one or more tanks or equivalent receptacles is measured and the measured quantity indicated at a remote observation station.

Many situations require the measurement of liquid level in a container from the exterior of the container and a variety of different devices have been developed to this end. The present invention relates to this field, and more particularly to electronic measurement wherein time is the measured quantity. It is well known that time may be measured with extreme precision and various means for accurate measurement of time in electronic circuits are readily available. This invention provides for translating liquid level variations into time variations through the utilization of pulse techniques. This has the advantage of very low power consumption in addition to the high degree of accuracy available. Also, the invention is particularly adapted to remote reading of liquid levels wherein a central or reading station may be removed from the location of one or more liquid receptacles any desired distance up to many miles.

It is an object of the present invention to provide for the accurate remote measurement of the level of liquid in a tank, or other liquid receptacle.

Another object of the invention is the provision of a liquid level measuring device and telemetry method by which liquid levels at a number of remote locations may be readily observed at a single monitoring station.

It is a further object of the invention to provide a telemetering system of the class described which produces time delays in pulses transmitted from a monitoring station to one or more remote locations and returned therefrom to the monitoring station, with such delays being proportional to the levels of liquid at the remote locations.

The foregoing and other objects and advantages of the invention will be better understood upon consideration of the following description of a preferred embodiment of the invention in conjunction with the accompanying drawing, wherein.

Figure 1:
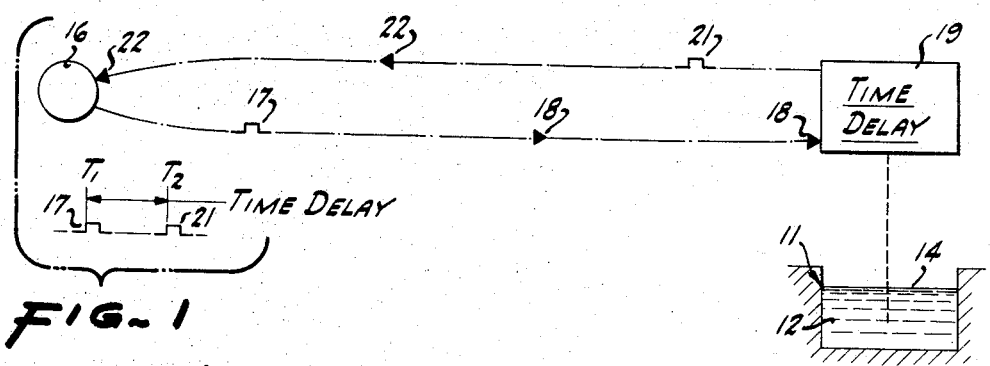
FIGURE 1 is a graphical representation of a liquid level telemetering method in accordance with the invention.

Referring now to FIGURE 1, there is illustrated a tank 11, or equivalent receptacle, containing a body 12 of liquid, such as gasoline or the like. In accordance with the present invention, provision is made to monitor the level 14 of the body of liquid from a remote location or monitoring station 16. In the accomplishment of the remote monitoring of the liquid level 14, a telemetering method is employed by transmitting a pulse 17 from the remote location 16 to the location of the liquid body 12, as indicated by the arrows 18. The electric pulse may be transmitted over any suitable transmission medium, such as a cable, free space, or the like. The pulse is received at the location of the liquid body, and is thereat delayed for a time proportional to the level of the liquid. This is schematically illustrated by time delay means 19 shown by a dotted line to be controlled by the level of the liquid. The intentionally delayed pulse 21 is returned to the remote location 16, as indicated by the arrows 22. The difference between the time $T_1$ of departure of the transmitted pulse 17 and time $T_2$ of return of the delayed pulse 21 then comprises the normal pulse transit time and the intentional time delay 19. This time $T_1-T_2$ is observed or recorded and the normal constant pulse transit time is subtracted therefrom to provide the variable time delay 19 as a measure of liquid level.

Generation of a time delay proportional to liquid level in the conduct of the method outlined above may be variously accomplished. The telemetering system hereof employs an electronic delay device, preferably a delay line, disposed at the location of the liquid body and the time delay of the device is varied in proportion to the liquid level. In the case of a delay line, the inductance of the line is varied in proportion to the liquid level. Since the delay of the line varies as a function of the inductance, the delay hence varies as a function of liquid level. The transmitted pulse 17 is passed through the delay device, and is therein delayed a time proportional to the inductance thereof which is, in turn, proportional to liquid level.

The liquid level telemetering method outlined above may be readily extended to facilitate the monitoring of the levels of bodies of liquid at a plurality of dispersed locations from a single monitoring station. In this regard, the system for a single body of liquid depicted in FIGURE 1 is merely multiplied to provide a similar system for each of the liquid bodies, all systems having the same monitoring station in common. Pulses may then be selectively transmitted from the monitoring station to the different locations, and the resulting pulse delays are observed at the monitoring station as indications of the levels of the bodies of liquid at the various dispersed locations. This method is advantageous in a variety of applications requiring the frequent provision at a single station of the level of liquids at distances therefrom. For example, in the petroleum industry it is necessary for a dispatcher at a central shipping point to be aware of the quantity of gasoline on hand in the storage tanks of a large number of service stations in the area, such that replinishment shipments of gasoline may be made in good time before tha tank contents are consumed. The service stations must at all times maintain an adequate inventory of gasoline commensurate with the expected rate of consumption by the customers. In accordance with the present invention, the inventory levels at the different stations can be substantially instantaneously and simultaneously monitored as desired from the replenishing shipping point. Efficient consolidation of gasoline shipments to the service stations may then be accomplished in a direct and accurate manner at the supply point without reliance being placed on recorder shipment requests submitted by the service station operators.

Figure 2:
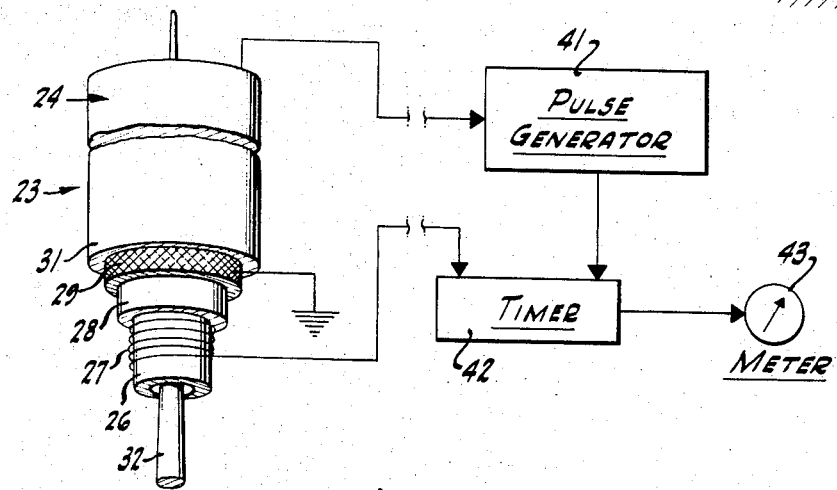
FIGURE 2 is a perspective schematic illustration of a gauge unit and associated circuitry forming a telemetering system in accordance with the invention.
Figure 3:
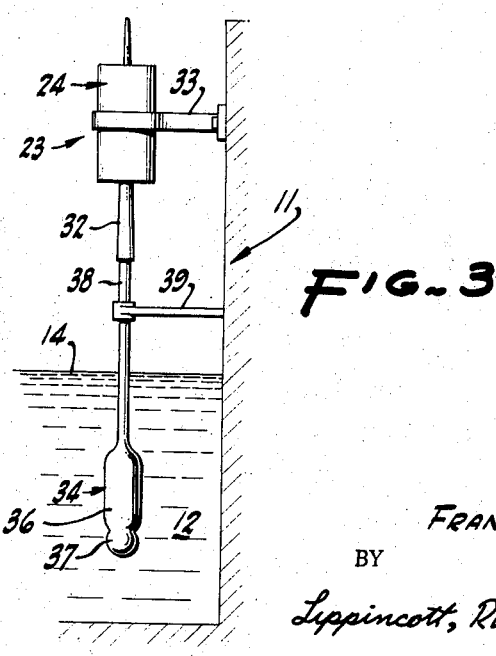
FIGURE 3 is a perspective view of the gauge unit or transducer of the telemeter system, illustrated as it may be mounted in a tank engaging liquid whose level is to be monitored.

Considering now a preferred form of liquid level telemeter with which the telemetering method described hereinbefore may be readily conducted, reference is made to FIGURES 2 and 3. As shown therein, the telemeter 23 includes a delay line 24 which is generally conventional insofar as delay theory is concerned. The line 23 may have either distributed constants, such as commercially available RG–65/V line, or lumped constants. In the illustrated example, the line includes a central tubular cylindrical form 26 of insulating material, such as Saran, having a helical coil 27 of insulated conducting wire coaxially disposed about the coil windings. An annular nular layer 28 of insulating material, such as kraft paper, coaxially dsposed about the coil windings. An annular conducting sheath 29 of, for example, wire braid, is in turn coaxially disposed about the layer 28 and an insulating cover 31 of plastic or the like is coaxially disposed about the conducting sheath. A lumped constant line similarly includes an insulated conductive wire coil wound upon a tubular form of insulating material. However, in this case a plurality of condensers are connected at spaced tapping points of the coil and shunt connected relative to each other to provide lumped capacitances in place of the distributed capacitance existing between the coil 27 and outer conducting sheath 29 of the distributed constant line.

It will be appreciated that the delay line, whether of the distributed or lumped constant varieties, has a time delay which is a direct function of the inductance and capacitance of the line. Thus, by varying either the inductance or capacitance, the delay time of the line is correspondingly varied. The inductance is herein varied by means of a core 32 of permeable material, such as ferrite, which is movable coaxially within the coil 27. As the core moves into the coil, the inductance of the latter is increased, as is the time delay of the line. Conversely, the coil inductance and time delay are decreased as the core moves out of the coil. The core is tapered in order to provide a continuous variation in inductance.

As is best shown in FIGURE 3, the delay line 24 as employed in the telemeter 23, may be mounted by means of a bracket 33, or the like, upon the interior wall of the tank 11, or other liquid containing receptacle. The core 32 is secured at its lower end to buoyant means 34, which may take the form of a hydrometer including a float 36 and ballast 37. To facilitate guidance of the core and hydrometer assembly relative to the delay line 24, the core and hydrometer are advantageously interconnected by an elongated cylindrical shank 38 which slidably extends through a guide bracket 39 secured to the tank wall. The hydrometer is immersed in the liquid body 12. Thus as the level 14 of the liquid body 12 varies, the hydrometer follows the variation and correspondingly moves the core axially of the line 24. As the liquid level decreases or increases, the vertical location of the hydrometer in the tank correspondingly changes. The core 32 is in turn moved out of, or into, the line to thereby decrease or increase the inductance thereof. In this manner, the time delay of the line varies as a direct function of the liquid level 14.

With the telemeter mounted in a tank 11, or the like, a pulse generator 41 at a remote location, such as the location 16 mentioned in the foregoing description of the method hereof, is connected to one end of the coil 27 of the delay line 24. The pulse generator is also preferably connected to a timer 42 which is also connected to the second end of the coil to receive the delayed pulses therefrom. The output of the timer operates a meter 43 or the like, which indicates the time delay between a pulse transmitted from the pulse generator 41 and a delayed pulse received by the timer from the delay line. The meter may be calibrated to indicate the delay introduced by the telemeter unit 23 without including the normal pulse transit time. This delay is directly related to the vertical position of the hydrometer and thus to the liquid level. A plurality of similar systems can, of course, be provided at a common metering location and associated with telemeters 23 at a plurality of liquid body locations to monitor the liquid levels thereat. With a plurality of liquid level locations different transit times must be considered to obtain the telemeter delay.

Although the invention has been described hereinbefore with respect to specific steps in the method thereof, and as to a single embodiment of the apparatus, it will be appreciated that various modifications and changes may be made therein without departing from the spirit and scope of the invention, and thus it is not intended to limit the invention except by the terms of the appended claims.

What is claimed is:

1. A liquid level telemetering system for monitoring the level of a liquid body, said system comprising:
   time delay means for delaying an electrical pulse, said time delay means being positioned out of contact with the liquid body;
   time delay control means for varying the time delay of the time delay means in proportion to changes in the level of the liquid body;
   means for transmitting an electrical pulse from a measuring station to the time delay means;
   means for transmitting the same electrical pulse back to the measuring station after it passes through the time delay means; and
   indicating means for indicating the time delay of the electrical pulse through the time delay means to provide an indication of the level of the liquid body.

2. A liquid level telemetering system as in claim 1 wherein:
   said time delay means comprises a time delay line mounted above the liquid body and having a hollow center portion;
   said time delay control means comprises a permeable core mounted for translation in the hollow center portion of the time delay line to vary its time delay; and
   said time delay control means further comprises buoyant means secured to the permeable core and immersible in the liquid body for translating the permeable core in the hollow center portion of the delay line in accordance with changes in the level of the liquid body.

3. A liquid level telemetering system as in claim 2 wherein said buoyant means comprises a hydrometer.

4. A liquid level telemetering system as in claim 3 wherein said indicating means comprises:
   timing means for measuring the time delay between transmission of a pulse from the measuring station and receipt of the same pulse at the measuring station; and
   a meter coupled to the timing means to indicate the measured time delay as a representation of the level of the liquid body.

5. A liquid level telemetering system as in claim 4 wherein said permeable core is tapered.

References Cited

UNITED STATES PATENTS

| | | | |
|---|---|---|---|
| 2,067,959 | 2/1937 | Kuljian | 336—30 |
| 2,328,954 | 9/1943 | Conley | 340—151 |
| 2,525,893 | 10/1950 | Gloess | 73—304 X |
| 3,277,391 | 10/1966 | Berstein | 333—31 |

LOUIS R. PRINCE, *Primary Examiner.*

S. C. SWISHER, *Assistant Examiner.*

UNITED STATES PATENT OFFICE
CERTIFICATE OF CORRECTION

Patent No. 3,343,416  September 26, 1967

Franklin C. Chiang

It is hereby certified that error appears in the above numbered patent requiring correction and that the said Letters Patent should read as corrected below.

Column 3, lines 6 and 7, for "disposed about the coil windings. An annular nular" read -- wound thereon The coil is covered by an annular --; line 7, for "kraft" read -- Kraft --.

Signed and sealed this 15th day of October 1968

(SEAL)
Attest:

Edward M. Fletcher, Jr.  EDWARD J. BRENNER
Attesting Officer  Commissioner of Patents